Figure 1:
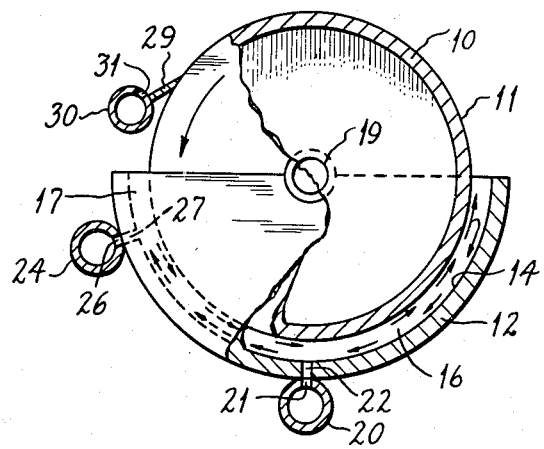

April 24, 1956

J. C. JANSMA 2,743,015

METHOD AND APPARATUS FOR SEPARATING
LIQUIDS BY THERMAL DIFFUSION
Filed April 21, 1953

INVENTOR.
JOHN C. JANSMA
BY
Campbell, Brumbaugh, Free & Graves
ATTORNEYS

United States Patent Office 2,743,015
Patented Apr. 24, 1956

2,743,015

METHOD AND APPARATUS FOR SEPARATING LIQUIDS BY THERMAL DIFFUSION

John C. Jansma, Maple Heights, Ohio, assignor to The Standard Oil Company, Cleveland, Ohio, a corporation of Ohio Application April 21, 1953, Serial No. 350,161

3 Claims. (Cl. 210—52.5)

This invention relates to improvements in apparatus and continuous methods for separating liquid mixtures by thermal diffusion.

It has been known for some time that the imposition of a temperature gradient across a liquid mixture, a term intended herein to include mixtures of miscible liquids, liquids containing one or more materials in solution, and the like, creates thermal diffusive forces tending to separate the mixture into two or more fractions containing components of the mixture in concentrations that differ appreciably from the concentrations thereof in the initial mixture. Advantage may be taken of this phenomenon by confining a liquid mixture in a narrow separation chamber or slit defined by opposed and closely spaced walls of thermally conductive, impervious and inert material and maintaining one of the walls at a temperature appreciably higher than the other. A liquid mixture so confined tends to separate into at least two fractions, one of which accumulates adjacent the face of the hotter wall and is enriched in one of the components of the mixture, and another of which accumulates adjacent the face of the cooler wall and is impoverished in said component or enriched in another component.

Suggestions have been made in the art to separate liquid mixtures by thermal diffusion in a continuous manner. Generally this involves introducing a stream of the liquid mixture into a separation chamber defined by stationary and closely spaced walls maintained at different temperatures and continuously withdrawing a first fraction from adjacent the face of the hotter wall of the chamber and a second fraction from adjacent the face of the cooler wall of the chamber. Such continuous methods are conveniently classified into concurrent flow and countercurrent flow methods. In concurrent flow methods the liquid mixture is introduced into the separation chamber at one end and the fractions separated by thermal diffusion are both withdrawn from the chamber at the other end. In countercurrent flow methods the liquid mixture may be introduced into the separation chamber at any convenient point, e. g., at one end or at any point intermediate the ends, and the separated fractions are withdrawn at opposite ends. Thus, for example, it is possible to introduce the mixture into the separation chamber midway between the ends and to withdraw the separated fractions at the opposite ends. It is also possible to introduce the mixture at one end of the separation chamber, to remove one fraction at the same end and another fraction at the opposite end.

Apparatus for carrying out liquid thermal diffusion in a continuous manner has generally comprised, as the essential elements thereof, two closely spaced walls of heat-conductive material, means for maintaining one of the walls at a higher temperature than the other, at least one liquid inlet for introducing liquid into the narrow slit formed between the walls, and at least two liquid outlets for removing the liquid fractions which accumulate adjacent the hotter and cooler walls, respectively. Some proposals have been made heretofore to accelerate the flow of liquid in such apparatus, e. g., by providing, within the slit, movable tapes adjacent each of the opposed walls, the theory apparently being that the moving tapes would operate to drag the liquid fractions accumulating upon or near their surfaces to a suitable outlet for the respective fractions. Such apparatus, however, has the inherent disadvantages, not only of increasing tremendously the expense involved in construction, but also of interfering with the maintenance of an effective temperature gradient due to poor thermal conductivity between a given stationary wall surface and the most immediately adjacent movable tape.

Generally, the apparatus of this invention comprises an inner rotatable wall member, preferably a cylindrical drum, of inert, thermally conductive material having a smooth outer face defined by a surface of revolution about a reference axis, e. g., the axis of rotation of a drum. It also includes an outer wall member of inert, thermally conductive material having a smooth inner face defined by a second surface of revolution about the reference axis. This member is preferably in the form of an open trough, the inner surface of which is substantially semi-cylindrical, i. e., the edges of the surface lie in substantially a plane of reference intersecting the reference axis. An inlet for the liquid to be subjected to thermal diffusion is provided in the outer wall member. This inlet communicates with a separation chamber defined by the closely spaced outer face of the inner wall member and the inner face of the outer wall member. At least one outlet for each liquid is provided in the outer wall member at a location remote from the inlet, and this outlet communicates with the separation chamber defined as aforesaid. Finally, means, preferably comprising a scraper or a doctor blade in contact with the outer face of the rotatable inner member and an appropriate duct or conduit connected thereto, are provided for removing, upon rotation of the inner wall member, a liquid fraction on the surface of the inner wall member.

A surface of revolution is by definition a surface generated by revolving a plane curve about a line, i. e., a reference axis, lying in its plane. This term, therefore, includes the surface of cylinders, cones and the like.

The method of the invention generally comprises introducing a liquid mixture into the separation zone defined by the opposed faces of the inner and outer wall members, subjecting the liquid to a temperature gradient while confining it in the separation zone, rotating the inner wall member at peripheral speed insufficient to create substantial turbulence in the confined liquid, and separately withdrawing the fractions of the liquid mixture accumulating adjacent the respective walls.

The primary advantage of the apparatus and method of the invention is its extraordinary simplicity as compared with the complicated structures and laborious methods heretofore proposed.

Another important advantage, particularly of the apparatus of the invention, is that the fraction accumulating adjacent the outer face of the inner wall member is forced by rotation of said member to leave the separation chamber at a speed in excess of that which would be provided by thermal circulation and is relatively independent of the viscosity of the liquid fraction accumulating adjacent said surface.

Another advantage is that the relatively heated and cooled wall members are in direct contact with the liquid in the separation chamber, thus providing maximum efficiency in establishing and maintaining a temperature gradient from one wall to the other.

Figure 2:
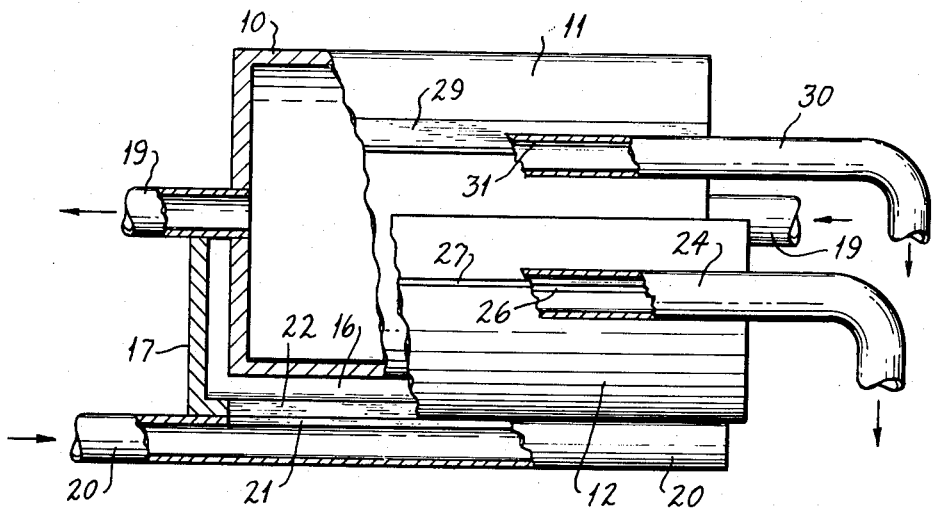

These and further advantages, as well as the utility of the invention, will become more apparent from the following detailed description made with reference to the accompanying drawing, wherein:

Fig. 1 is an end view, partly in cross-section, of one form of apparatus embodying the invention; and Fig. 2 is a side view in elevation, also partly in cross-section, of the apparatus illustrated in Fig. 1.

Referring now to the apparatus illustrated in the drawing, an outer rotatable wall member such as a drum 10 having a smooth outer and cylindrical face 11 is mounted for rotation in an outer wall member 12 having a smooth inner face 14, the face 14 and the lower portion of the face 11 defining a separation chamber 16. The outer wall member 12 is provided with side walls 17 which may, if desired, be utilized as bearing surfaces for rotatably supporting the inner wall member 10 on a hollow shaft 19.

The inlet for liquid to be subjected to thermal diffusion may, as shown in the drawing, comprise a conduit 20 having a longitudinal opening 21 communicating with an opening 22 of corresponding length in the outer wall member 12. The outlet shown in the drawing for withdrawing the liquid fraction accumulating adjacent outer wall member 12 may be of substantially similar construction, e. g., a conduit 24 having a longitudinal opening 26 communicating with a corresponding opening 27 in the outer wall member 12.

A scraper or doctor blade 29 in contact with the outer face 11 of the inner wall member 10 is provided with a third conduit or duct 30 having a longitudinal opening 31 communicating with the upper surface of the scraper or doctor blade 29.

In operation, the drum 10, and therefore the outer face 11 thereof, are maintained at a relatively higher or lower temperature than the inner face 14 of the outer wall member 12. This may readily be accomplished by any suitable means, e. g., by introducing steam into the drum by way of hollow shaft 19 and cooling the wall member 12 by immersion in a cooling jacket or simply by exposure to air. The drum 10 is rotated and the liquid to be subjected to thermal diffusion is continuously introduced into the separation chamber by way of conduit 20 and openings 21 and 22. The components of the liquid tending to accumulate adjacent the hot wall, i. e., the outer face 11 of the drum 10, are carried along with the drum as it rotates and thus leave the separation chamber to be removed from the face 11 by means of the scraper or doctor blade 29 to flow into the conduit or duct 30 by way of opening 31. The components tending to accumulate adjacent the cold wall, i. e., the face 14 of the outer wall member 12, move by displacement toward the opening 27 and pass therethrough into the conduit 24 by way of opening 26.

It is to be understood that many modifications and changes will readily occur to those skilled in the art upon reading this description. Thus, for example, it is within the scope of the invention to relatively cool the rotated surface and heat the stationary surface and also to modify the inlet and outlet in any suitable manner as well as to place them at different locations. All such modifications are intended to be included within the scope of the invention as defined in the appended claims.

I claim:

1. Apparatus for separating liquid mixtures into dissimilar fractions by thermal diffusion which comprises an inner wall member of inert, thermally conductive material having a smooth outer face defined by a first surface of revolution about a horizontal reference axis; means supporting said inner wall member for rotation about said axis, means for rotating said inner wall member around said axis, an outer wall member of inert, thermally conductive material having a smooth inner face defined by a second surface of revolution about said reference axis; said inner and outer faces of the outer and inner wall members, respectively, being opposite one another and substantially equidistantly and closely spaced to define a separation chamber for the liquid; means providing an inlet extending axially substantially the entire length of said chamber for liquid in the outer wall member communicating with the chamber; means providing an outlet extending axially substantially the entire length of said chamber for liquid in the outer wall member communicating with the chamber at a location remote from the inlet; said outlet and inlet providing a low linear flow into and out of said chamber to maintain optimum stratification; means for removing, upon rotation of the inner wall member, a liquid fraction on the surface of said inner wall member; and means for maintaining one of the wall members at a higher temperature than the other.

2. Apparatus as defined in claim 1 wherein the outer face of the inner wall member is cylindrical, the inner face of the outer wall member is substantially a half-cylinder, the reference axis is substantially horizontal, and the lower half of the outer cylindrical face of the inner wall member is opposite the semi-cylindrical inner face of the outer wall member.

3. A method for separating liquid mixtures into dissimilar fractions by thermal diffusion, which comprises introducing a liquid mixture into a separation zone between two smooth, opposed, closely spaced and thermally conductive walls defined by surfaces of revolution about a single horizontal reference axis; maintaining one of said walls at a higher temperature than the other of said walls to separate the mixture into at least two dissimilar fractions, one adjacent the face of each of the opposed walls; rotating one of the walls on the reference axis at a peripheral speed insufficient to create substantial turbulence in the confined mixtures; removing a liquid fraction from the surface of said one of the walls, upon rotation of said one of the walls, and separately withdrawing a fraction of the liquid mixture accumulated adjacent the other wall.

References Cited in the file of this patent
UNITED STATES PATENTS

| | | |
|---|---|---|
| 1,151,999 | Bird | Aug. 31, 1915 |
| 1,515,130 | Morrison | Nov. 11, 1924 |
| 1,573,085 | Meiani | Feb. 16, 1926 |
| 1,747,155 | Birdsall | Feb. 18, 1930 |
| 2,521,112 | Beams | Sept. 5, 1950 |
| 2,541,069 | Jones et al. | Feb. 13, 1951 |
| 2,541,071 | Jones et al. | Feb. 13, 1951 |
| 2,689,653 | Ohlstrom | Sept. 21, 1954 |

FOREIGN PATENTS

| | | |
|---|---|---|
| 305,411 | Germany | May 3, 1918 |